(12) United States Patent
Dierks, Jr. et al.

(10) Patent No.: US 7,469,296 B2
(45) Date of Patent: *Dec. 23, 2008

(54) METHOD AND APPARATUS FOR AN IMPROVED BULK READ SOCKET CALL

(75) Inventors: Herman Dietrich Dierks, Jr., Round Rock, TX (US); Vinit Jain, Austin, TX (US); Agustin Mena III, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 264 days.

This patent is subject to a terminal disclaimer.

(21) Appl. No.: 11/375,785

(22) Filed: Mar. 15, 2006

(65) Prior Publication Data

US 2006/0161677 A1    Jul. 20, 2006

Related U.S. Application Data

(63) Continuation of application No. 09/892,968, filed on Jun. 27, 2001, now Pat. No. 7,065,581.

(51) Int. Cl.
*G06F 15/16* (2006.01)
*G06F 3/06* (2006.01)
*H04L 12/28* (2006.01)
*H04L 12/56* (2006.01)

(52) U.S. Cl. ............... 709/232; 709/234; 710/52
(58) Field of Classification Search ............ 709/232, 709/234; 710/52; 370/395.52
See application file for complete search history.

(56) References Cited

U.S. PATENT DOCUMENTS 5,708,779 A    1/1998  Graziano et al.
5,721,955 A    2/1998  Cedros et al.

(Continued)

OTHER PUBLICATIONS

Matsue, Takahiro, "Scalable Automatic Buffer Tuning to Provide High Performance and Fair Service for TCP Connections", 1999, http://citeseer,ist.psu.edu/article/matsue00scalable.html.

(Continued)

*Primary Examiner*—John Follansbee
*Assistant Examiner*—Philip J Chea
(74) *Attorney, Agent, or Firm*—Duke W. Yee; Herman Rodriguez; Wayne P. Bailey

(57) ABSTRACT

An apparatus and method for an improved bulk read socket call are provided. With the apparatus and method, a new field, so_rcvlen, is added to the socket structure that identifies the bulk read size requested by the user. The kernel of the prior art recv( ) function is also modified so that it sets the so_rcvlen to the size requested by the user prior to the recv( ) function going to sleep and waiting for the full data size requested by the user. A new flag, SP_MSGWAITALL, is also provided in the socket structure. In the TCP input processing, when data is received for a particular socket, the current setting of the SP_MSGWAITALL is checked. If the SP_MSGWAITALL flag is set, it is determined whether the amount of data stored in the socket receive buffer is less than the value of so_rcvlen. If not, the TCP input processing does not wake up the recv( ) thread. However, for every alternate segment, the TCP input processing sends back an acknowledgment (ACK). In the TCP output processing, when the SP_MSGWAITALL flag is set and the amount of data in the socket receive buffer is less than so_rcvlen, the full window is advertised. Once the TCP input processing determines that there is at least an amount of data in the socket receive buffer equal to the value of so_rcvlen, the TCP input processing will wake up the recv( ) thread and the SP_MSGWAITALL flag is reset.

6 Claims, 4 Drawing Sheets

U.S. PATENT DOCUMENTS

| | | |
|---|---|---|
| 5,732,286 A | 3/1998 | Leger |
| 5,751,970 A | 5/1998 | Bournas |
| 5,797,033 A | 8/1998 | Ecclesine |
| 5,819,043 A | 10/1998 | Baugher et al. |
| 5,872,920 A | 2/1999 | Hausman et al. |
| 5,878,217 A | 3/1999 | Cherukuri |
| 5,974,518 A | 10/1999 | Nogradi |
| 6,034,945 A | 3/2000 | Hughes et al. |
| 6,112,252 A | 8/2000 | Hausman et al. |
| 6,182,165 B1 | 1/2001 | Spilo |
| 6,256,660 B1 | 7/2001 | Govindaraju et al. |
| 6,285,601 B1 | 9/2001 | Smith |
| 6,453,360 B1 | 9/2002 | Muller et al. |
| 6,564,267 B1 | 5/2003 | Lindsay |
| 6,651,136 B2 | 11/2003 | Percival |
| 6,675,220 B1 | 1/2004 | Bergamasco et al. |
| 6,684,273 B2 | 1/2004 | Boulandet et al. |
| 6,765,878 B1 | 7/2004 | Carlson |
| 6,829,662 B2 | 12/2004 | King-Smith et al. |
| 6,907,042 B1 | 6/2005 | Oguchi |
| 2003/0097401 A1 | 5/2003 | Bauman et al. |

OTHER PUBLICATIONS

Hasegawa, Go, "Scalable Socket Buffer Tuning for High-Performance Web Servers", 2000, http://citeseer.ist.psu.edu/article/haseqava00scalable.html.

Allman, Mark, "On Estimating End-to-End Network Path Properties", 1999, http://citeseer.ist.psu.edu/allman99estimating.html.

Dunigan, Tom, "TCP auto-tuning zoo", May 12, 2004, http://www.csm.ornl.gov/~dunigan/netperf/auto.html.

Hall, Brian, "Using Internet Sockets", Beej's Guide to Network Programming, Oct. 8, 2001, http://www.ecst.csuchico.edu/~beej/guide/net/html/index.html.

METHOD AND APPARATUS FOR AN IMPROVED BULK READ SOCKET CALL

This is a continuation of U.S. patent application Ser. No. 09/892,968, filed on Jun. 27, 2001 now U.S. Pat. No. 7,065,581, which is incorporated by reference herein.

BACKGROUND OF THE INVENTION

1. Technical Field

The present invention is directed to a method and apparatus for an improved bulk read socket call.

2. Description of Related Art

The Internet has become a significant communication media in the modern world and is enabling the world to migrate to one global data communications system. The Internet uses the Transmission Control Protocol/Internet Protocol (TCP/IP) suite of protocols to provide a common communications mechanism for computers, and other data transmission devices, to communicate with one another.

Communication with applications running on a server is typically performed using ports and addresses assigned to the application and the server apparatus. A port may be a physical port or a logical port. A physical port is a pathway into and out of a computer or a network device such as a switch or router. For example, the serial and parallel ports on a personal computer are external sockets for plugging in communications lines, modems and printers. Every network adapter has a port (Ethernet, Token Ring, etc.) for connection to the local area network (LAN). Any device that transmits and receives data implies an available port to connect to each line.

A logical port is a number assigned to an application running on the server by which the application can be identified. While a server may have a single physical port, the server may make use of a plurality of logical ports. The combination of a logical port identifier and the address of the server apparatus is referred to as a socket.

The address of the server is a network address that identifies the server in the network and how to route data to a particular physical port of the server through the network. The address may take the form of a Uniform Resource Locator (URL), or in the case of the Internet, an Internet Protocol (IP) address such as 205.15.01.01, or the like. The address is included in headers of data packets transmitted by a device. The data packets are routed through the network from device to device by reading the header of the data packet and determining how to route the data packet to its intended destination based on the address.

Once the data packet arrives at the intended destination server apparatus, the server determines the destination application based on the logical port identifier included in the header information of the data packet. A data packet may be directed to a particular logical port by including the logical port identifier in its header information.

An application on a server "listens" to a logical port by retrieving data having a logical port identifier that identifies the logical port associated with that application. The application will take the data directed to its logical port and place it in a queue for the application. In this way, data may be routed through a network to a server apparatus and provided to a particular application on the server apparatus for processing.

The TCP/IP protocol provides various socket functions that may be used in the handling of data as the data is transported to and from an application through the socket. One such function that is typically used by FTP file and print services is the recv(int sock, (void *) buffer, int flags) read function. This read function further has a known feature MSG_WAITALL that allows an application to read a large amount of data at one time as a bulk read instead of reading a large amount of data doing multiple calls of the recv( ) function.

For example, assume that a user wishes to read data in bulk units of 60,000 bytes. Using the MSG_WAITALL bulk read feature of the recv( ) function, each time data is stored in the receive socket buffer, the recv( ) bulk read function is awakened. The recv( ) examines the receive socket buffer to determine if 60,000 bytes are in the receive socket buffer. If not, the recv( ) goes back to sleep and waits until another amount of data is stored in the receive socket buffer when it will again be awakened. If there is 60,000 bytes in the receive socket buffer, this amount of data is read from the receive socket buffer and provided to the calling application.

With this bulk read function, a single call to the recv( ) function is made rather than multiple calls and thus, the overhead associated with the extra system call execution is avoided. However, this feature, when used with TCP sessions has many limitations.

First, even though the recv( ) function waits for the full amount of data the user has requested, the TCP wakes up the blocked thread, i.e. the thread from the calling application that calls recv( ), each time a data segment arrives. The thread wakes up and checks if the full data has arrived. If not, it goes back to sleep again. For a 64 Kb recv( ) function call, for example, receiving 1460 byte Maximum Segment Size (MSS) TCP segments, this would result in approximately 43 unnecessary wakeups of the thread and the associated overhead.

Second, when MSG_WAITALL is used, TCP acknowledgments are delayed up to 200 milliseconds. The reason for this is that acknowledgments are triggered by the application reading at least 2 MSS worth of data from the receive socket buffer. However, when the MSG_WAITALL feature is used, since the data remains in the receive socket buffer until the user requested amount of data is gathered in the buffer, acknowledgments will not be sent until the delayed acknowledgment timer expires. The delayed acknowledgment timer is a timer that delays the sending of an acknowledgment of receipt of data up to 200 milliseconds in anticipation of sending the acknowledgment with data that needs to be sent in the reverse direction. Delaying the acknowledgments so much causes a number of problems.

For example, the TCP's congestion control and avoidance schemes, such as slow start and the like, depend heavily on incoming acknowledgments. Slow start, for example, is the phase of data transmission in which the sending computing device sends data slowly and increases the data flow on the arrival of each acknowledgment from the receiving computing device.

Thus, for example, if the acknowledgments are delayed, during the slow start phase, the congestion window will open up very slowly, i.e. the data flow will increase very slowly. The congestion window is a measurement of the amount of data that a sender may send to a receiving computing device and avoid causing congestion in the data network.

In addition, the fast recovery mechanism after detecting packet loss recovers solely depending on the arrival of acknowledgments. For example, assume that a receiver is waiting for 32 Kb of data on a recv( ) function call with MSG_WAITALL set and a sender's congestion window is currently 22 segments, i.e. TCP packets, of 1460 bytes. If a data packet gets dropped, the fast retransmit algorithm retransmits the dropped segment after receiving three duplicate acknowledgments but also halves the congestion window to 11 segments to thereby slow down the data traffic in the network.

Assuming, for example, a single packet drop, the receiver would acknowledge all 22 segments on receiving the dropped segment and the recv( ) function should complete. However, for the next "send", the sender is allowed to send only 11 segments whereas the receiver is waiting for the full 32 Kb. There will now be a pause until the 200 millisecond delayed acknowledgment timer expires. Then the TCP would acknowledge the 11 segments. Now the sender can send the next 11 segments. On receiving the next 11 segments, the recv( ) function would also complete. However, since the sender is now in a fast recover phase, the congestion window opens up by only 1/11th of the segment size per acknowledgment. Therefore, for the next recv( ) call, the same 200 millisecond delay occurs. This continues until the congestion window grows back to 22 segments. The above example considers only one segment loss for this duration. The situation is considerably worse when multiple packet drops occur.

Third, when the MSG_WAITALL flag is used, since the receiver's advertised window, i.e. the size of the receivers TCP buffer, keeps reducing until the recv( ) function gets the full data requested by the user, a situation may occur where the sender hits the persist timer delays (minimum of 5 seconds in most implementations). The persist timer delays are the delays perceived by the sending computing system due to probing of the receiving computing system to determine when the receiving computing system TCP buffer is no longer full. This is caused due to the fact that TCP is byte oriented and not message oriented.

A 32 Kb message written by the sender gets packetized and depacketized by TCP in a manner determined by TCP. When the receiver side window reduces to a value less than the MSS used by the connection, the sender defers sending this small amount of data (if it has enough data queued in its send buffer) until the receiver opens up its window because the sender thinks the receiver is busy and is slow to read the data. This may not be the case, however, because the receiver might actually be waiting on the recv( ) function for just this small piece of data to make the 32 Kb that the user has requested.

Thus, it would be beneficial to have a method and apparatus for an improved bulk read socket call that avoids the drawbacks of the prior art outlined above.

SUMMARY OF THE INVENTION

The present invention provides an apparatus and method for an improved bulk read socket call are provided. With the apparatus and method of the present invention, a new field, so_rcvlen, is added to the socket structure that identifies the bulk read size requested by the user. The kernel of the prior art recv( ) function is also modified so that it sets the so_rcvlen to the size requested by the user prior to the recv( ) function going to sleep and waiting for the full data size requested by the user. In addition, a new flag, SP_MSGWAITALL, is also provided in the socket structure.

In the TCP input processing of the present invention, when data is received for a particular socket, the current setting of the SP_MSGWAITALL is checked. If the SP_MSGWAITALL flag is set, it is determined whether the amount of data stored in the socket receive buffer is less than the value of so_rcvlen. If not, the TCP input processing does not wake up the recv( ) thread. However, for every alternate segment, the TCP input processing sends back an acknowledgment (ACK).

In the TCP output processing of the present invention, when the SP_MSGWAITALL flag is set and the amount of data in the socket receive buffer is less than so_rcvlen, the full window is advertised. Once the TCP input processing determines that there is at least an amount of data in the socket receive buffer equal to the value of so_rcvlen, the TCP input processing will wake up the recv( ) thread and the SP_MSG-WAITALL flag is reset.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
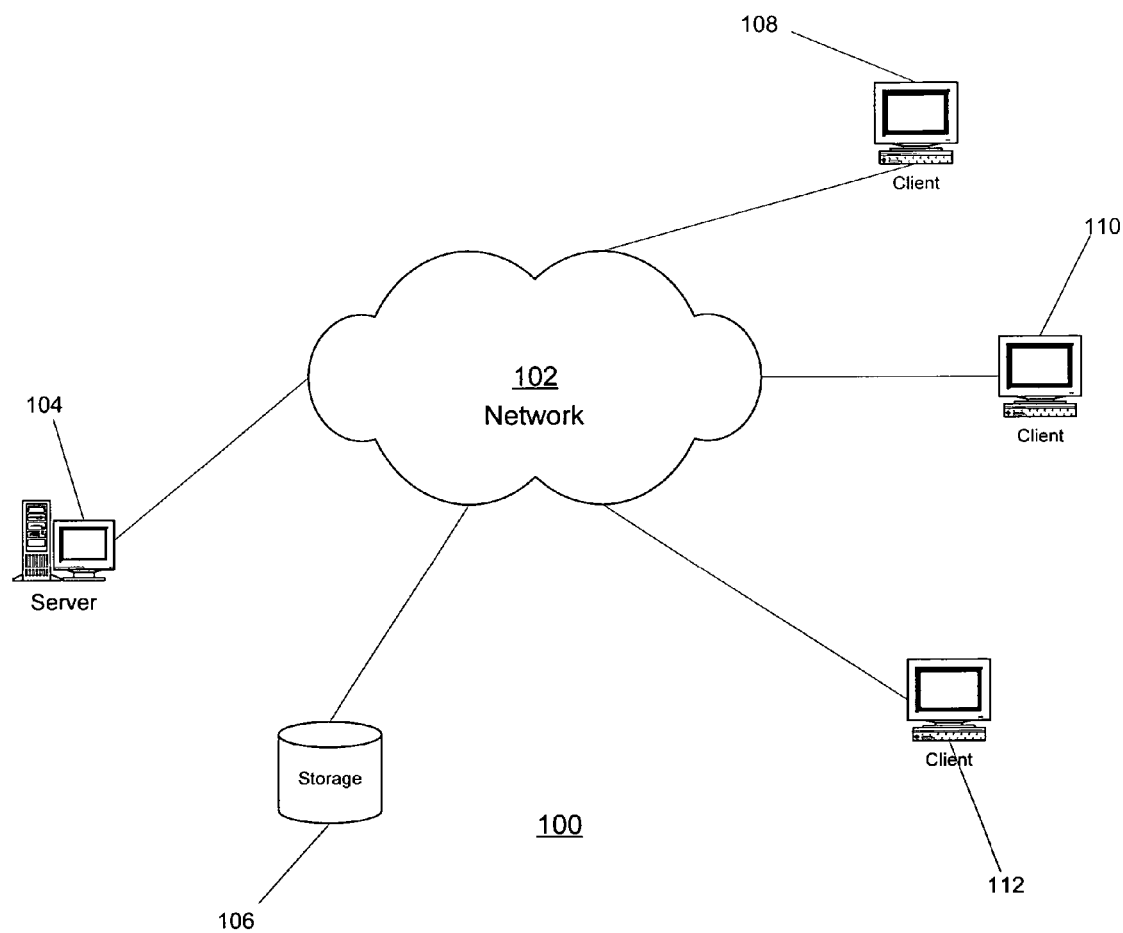
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
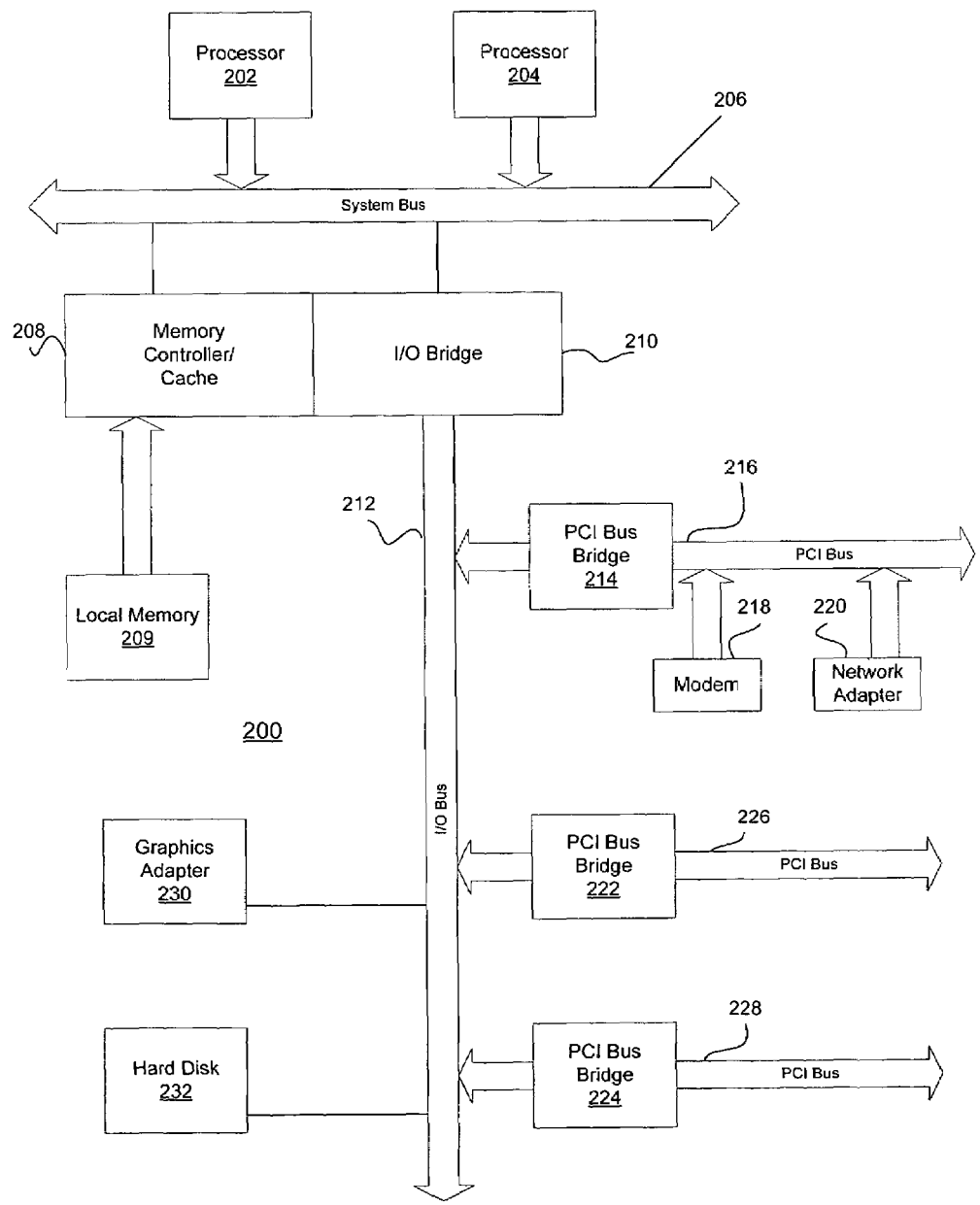
FIG. 2 is a block diagram of a data processing system that may be implemented as a server in accordance with a preferred embodiment of the present invention.

Referring to FIG. 2, a block diagram of a data processing system that may be implemented as a server, such as servers 104, 114, 118 in FIG. 1B, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1B may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
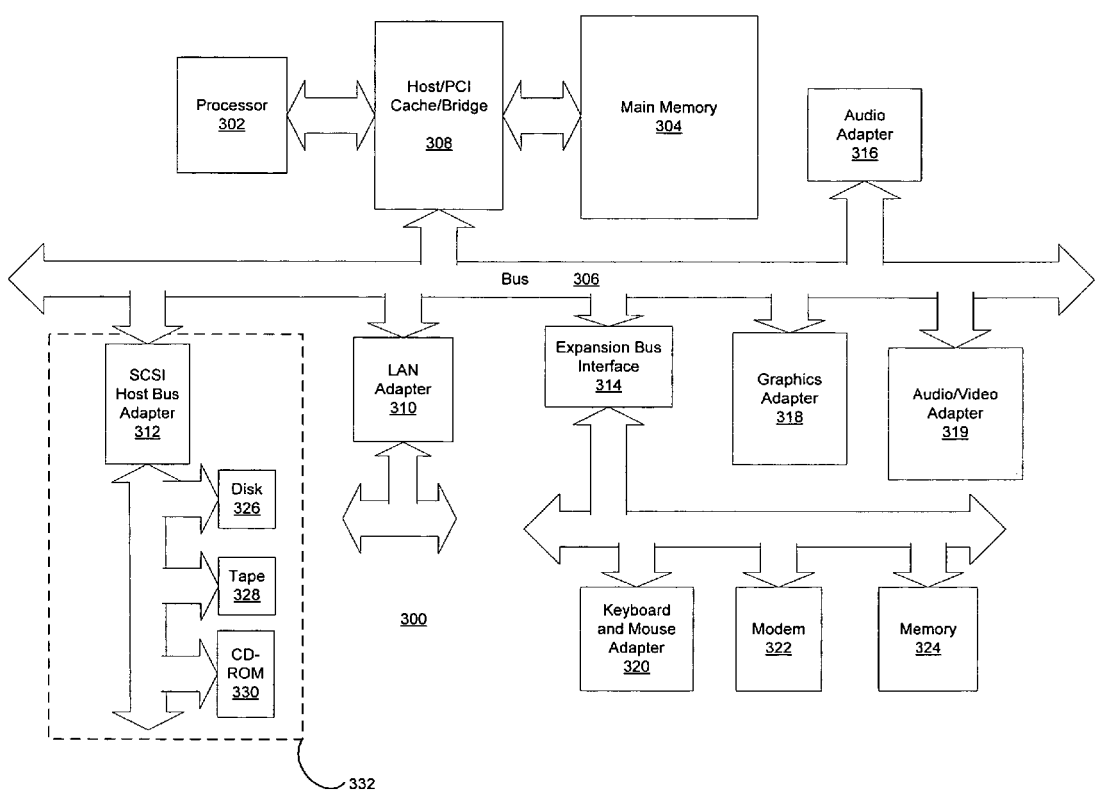
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a mechanism in the application layer and TCP layer of the standard TCP/IP stack that moves the monitoring function of the socket receive buffer from the recv( ) function to the TCP processing. In moving the monitoring function to the TCP processing, much of the overhead associated with waking up the recv( ) thread and putting it back to sleep in the prior art is eliminated. In addition, the problems with regard to not sending out acknowledgment messages are also overcome by the present invention.

With the present invention, a new field, so_rcvlen is added to the socket structure, i.e. the kernel structure per socket that contains the socket send and receive buffer queues, points to the communication protocol (TCP, UDP, UNIX, etc.) private data, and contains state and error information. This new field identifies the bulk read size requested by the user. The kernel of the recv( ) function, i.e. the fundamental part of a the recv( ) function that resides in memory at all times, is also modified so that it sets the so_rcvlen to the size requested by the user prior to the recv( ) function going to sleep and waiting for the full data size requested by the user.

In addition, a new flag, SP_MSGWAITALL, is provided in the field of the socket structure that stores flags. The SP_MSGWAITALL flag is used to identify when the functions of the present invention are to be implemented, as described hereafter. Thus, the application layer of the present invention is modified from the application layer of the prior art by providing a new field in the socket structure for identifying the requested bulk read size and by providing a new flag for identifying when the functions of the present invention are to be implemented.

With regard to the TCP layer, the present invention modifies the TCP layer of the prior art by providing additional functionality for performing functions based on the settings of the so_rcvlen, SP_MSGWAITALL, and the amount of data stored in the socket receive buffer, as detailed hereafter.

At different TCP states, TCP is required (under RFC 793), to handle incoming segments differently. TCP state transitions occur based on events such as incoming TCP segments. TCP input processing is the TCP code that is implemented to handle a TCP segment that arrives at a TCP enabled device. Some of the different tasks performed by TCP input processing include validating an incoming segment for data corruption, determining to which socket, i.e. which user application, this segment belongs, delivering data to the user application, performing state transitions (e.g., when the incoming segment indicates the connection needs to be closed), and the like.

With the present invention, in the TCP input processing, the following new functions are provided. When data is received for a particular socket, the current setting of the SP_MSGWAITALL is checked. If the SP_MSGWAITALL flag is set on the socket, a determination is made as to whether the amount of data stored in the socket receive buffer is less than the value of so_rcvlen. If the amount of data stored in the socket receive buffer is less than the value of so_rcvlen, the TCP input processing does not wake up the recv( ) thread. However, for every alternate segment, the TCP input processing sends back an acknowledgment (ACK).

Thus, the overhead of waking up the recv( ) thread and putting it back to sleep again, because there is not enough data in the receive socket buffer, is avoided. Additionally, the present invention sends out acknowledgments for every alternate segment and thus, the problems outlined above with regard to the prior art not sending out acknowledgments are avoided.

In the TCP output processing the following new functions are provided. When the SP_MSGWAITALL flag is set in the socket and the amount of data in the socket receive buffer is less than so_rcvlen, the full window is advertised. The full window is the window size advertised by the receiving computing device to the sending computing device at connection setup time. By advertising the full window, the receiving computing device informs the sending computing device of the available socket buffer space. This size then dynamically changes depending on how much space is available at any one time in the socket buffer. The space available is the original, or full window, size minus the amount of data queued in the socket buffer.

By advertising the full window in this manner, the present invention emulates the situation where the data stored in the socket receive buffer has been read by the application. This is only done when the SP_MSGWAITALL flag is set which guarantees that the recv( ) thread is blocked waiting for a sufficient amount of data. When the application is not looking at this socket at all, such as when the application is busy doing something else or when the system is busy, the operations of the prior art are implemented, i.e. the window is reduced as the buffer fills up.

Once the TCP input processing determines that there is at least an amount of data in the socket receive buffer equal to the value of so_rcvlen, the TCP input processing will wake up the recv( ) thread. The recv( ) thread is modified to reset the SP_MSGWAITALL flag and copy an amount of data equal to so_rcvlen in the socket receive buffer to the application's buffer. The next time the user calls recv( ) with MSG_WAITALL, if there is partial data stored in the socket receive buffer, a window update is sent out to the sending computing device. This will let the sender resume sending in case it is waiting for the window to be opened, i.e. Waiting for the receiver to inform the sender that there is space available in the receive socket buffer.

Figure 4:
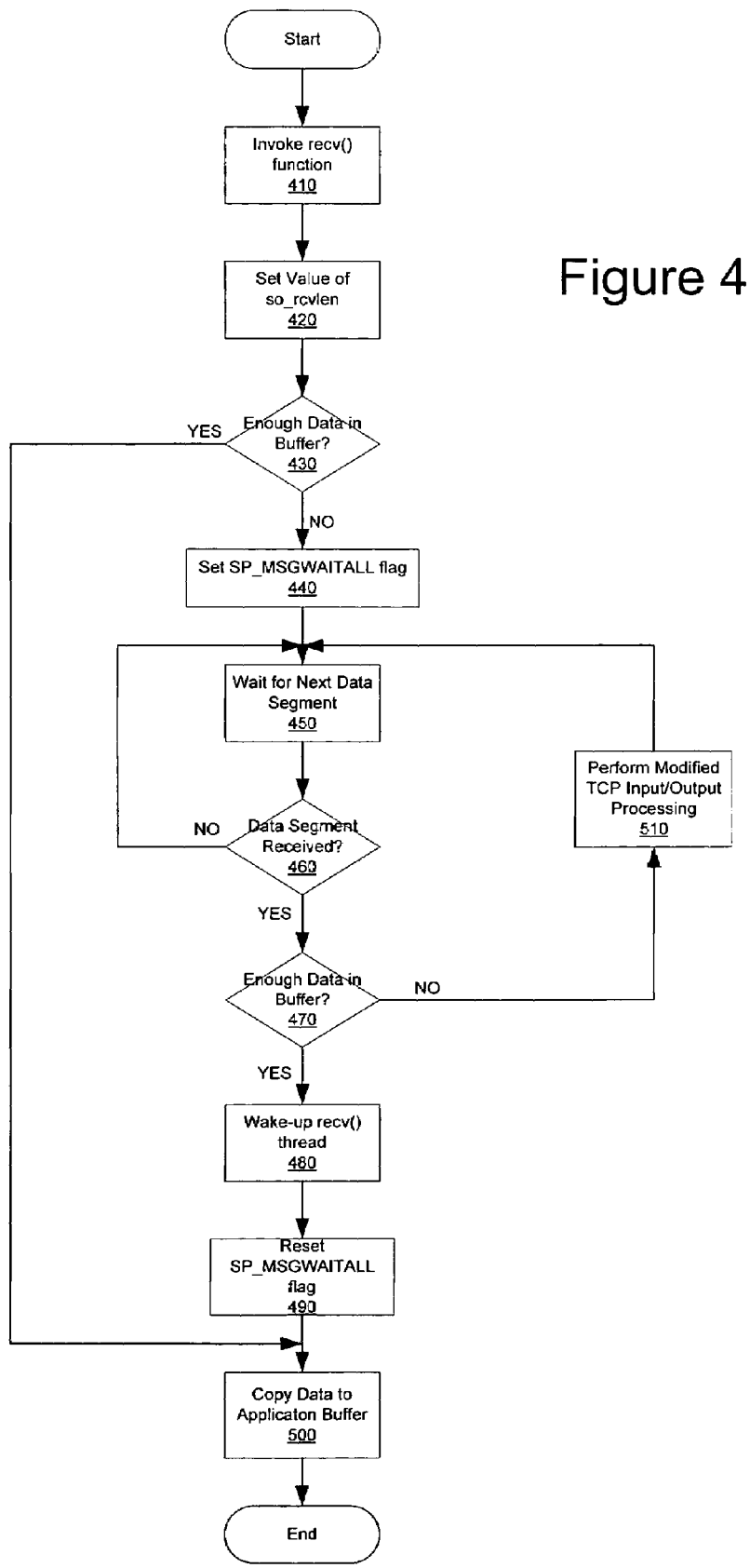
FIG. 4 is a flowchart outlining an exemplary operation of the present invention.

FIG. 4 is a flowchart outlining an exemplary operation of the present invention. The functions described in FIG. 4 may be performed in software, hardware, or a combination of software and hardware. In a preferred embodiment, the functions of the present invention detailed in FIG. 4 are performed as software instructions executed on a processor, such as those shown in FIGS. 2 and 3.

As shown in FIG. 4, the operation starts with invoking the recv( ) function (step 410). The value for so_rcvlen is set (step 420). A determination is then made as to whether there is an amount of data stored in the socket receive buffer at least equal to the value of so_rcvlen (step 430). If so, an amount of data equal to so_rcvlen is copied to the application buffer (step 500).

If there is not at least an amount of data equal to so_rcvlen in the socket receive buffer, the SP_MSGWAITALL flag is set (step 440). The operation then waits for a data segment to be received in the socket receive buffer (step 450). A determination is made as to whether a data segment is received in the socket receive buffer (step 460). If not, the operation returns to step 450 and continues to wait for a data segment.

Upon receiving a data segment in the socket receive buffer, a determination is made as to whether there is at least an amount of data in the socket receive buffer equal to so_rcvlen (step 470). If so, then the recv( ) thread is awaken (step 480) and the SP_MSGWAITALL flag is reset (step 490). An amount of data equal to so_rcvlen is then copied from the socket receive buffer to the application buffer, i.e. the application that called the recv( ) function (step 560).

If there is not at least an amount of data equal to so_rcvlen in the socket receive buffer, the modified TCP input and output processing are performed (step 510). This includes not waking up the recv( ) thread and sending out acknowledgments for every alternate segment received. In addition, the full window is advertised to the sender of the data segment. The operation then returns to step 450 and waits for the next data segment to arrive at the socket receive buffer.

Thus, the present invention provides a mechanism for performing bulk read operations using a socket receive buffer that avoids the problems associated with the prior art. The present invention moves the monitoring functions from the application layer recv( ) function to the TCP layer and thus, eliminates the need to repeatedly awaken and put back to sleep the recv( ) function. This provides a considerable savings with regard to processing cycles due to the reduction in overhead. In addition, the present invention provides acknowledgment messages for every alternate segment and thus, the problems associated with the non-transmission of acknowledgment messages in the prior art are avoided. Moreover, the full window is advertised to senders of data segments so that the delay associate with the prior art is avoided.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of performing a bulk read, comprising:

creating a socket structure for a socket associated with a logical port, wherein the socket structure contains a socket receive buffer;

initiating, by an application associated with the logical port, a bulk read function having a bulk read size, wherein the bulk read size is a size identified by the application associated with the logical port;

storing the bulk read size in a field in the socket structure;

checking a state of a flag in the socket structure, where the flag is used to conditionally invoke a function upon receipt of a data packet;

determining if an amount of data in the socket receive buffer is equal to or greater than the bulk read size if the flag is set;

in response to setting of the flag in the socket structure, activating the bulk read function only when there is an amount of data in the socket receive buffer equal to or greater than the bulk read size, wherein if the amount of data stored in the socket receive buffer is less than the bulk read size, the bulk read function is not activated; and receiving a Transport Control Protocol (TCP) segment for the socket from a sending device, wherein the steps of checking the state of the flag in the socket structure and determining if an amount of data in the socket receive buffer is less than the bulk read size are performed in response to receiving the TCP segment.

2. The method of claim 1, wherein if the amount of data stored in the socket receive buffer is less than the bulk read size, an acknowledgment is sent to the sending device for every alternate TCP segment received.

3. A method of performing a bulk read, comprising:

creating a socket structure for a socket associated with a logical port, wherein the socket structure contains a socket receive buffer;

initiating, by an application associated with the logical port, a bulk read function having a bulk read size, wherein the bulk read size is a size identified by the application associated with the logical port;

storing the bulk read size in a field in the socket structure;

determining if an amount of data in the socket receive buffer is equal to or greater than the bulk read size; and in response to setting of a flag in the socket structure, activating the bulk read function only when there is an amount of data in the socket receive buffer equal to or greater than the bulk read size;

wherein activating the bulk read function includes (i) copying an amount of data equal to the bulk read size from the socket receive buffer to an application buffer; and (ii) resetting the flag to deactivate the bulk read function, wherein activating the bulk read function further includes:

determining if there is data stored in the socket receive buffer after copying the amount of data equal to the bulk read size from the socket receive buffer to the application buffer; and sending a window update to a sending device if there is data stored in the socket receive buffer after the copying.

4. A computer program product in a computer readable recordable-type medium for performing a bulk read, comprising:

instructions for creating a socket structure for a socket associated with a logical port, wherein the socket structure contains a socket receive buffer;

instructions for initiating, by an application associated with the logical port, a bulk read function having a bulk read size, wherein the bulk read size is a size identified by the application associated with the logical port;

instructions for storing the bulk read size in a field in the socket structure;

instructions for checking a state of a flag in the socket structure, where the flag is used to conditionally invoke certain instructions upon receipt of a data packet;

instructions for determining if an amount of data in the socket receive buffer is equal to or greater than the bulk read size if the flag is set;

instructions, responsive to setting of a flag in the socket structure, for activating the bulk read function only when there is an amount of data in the socket receive buffer equal to or greater than the bulk read size, wherein if the amount of data stored in the socket receive buffer is less than the bulk read size, the instructions for activating are not executed; and instructions for receiving a Transport Control Protocol (TCP) segment for the socket from a sending device, wherein the instructions for checking the state of the flag in the socket structure and the instructions for determining if an amount of data in the socket receive buffer is less than the bulk read size are executed in response to receiving the TCP segment.

5. The computer program product of claim 4, further comprising instructions for sending an acknowledgment to the sending device for every alternate TCP segment received, if the amount of data stored in the socket receive buffer is less than the bulk read size.

6. A computer program product in a computer readable recordable-type medium for performing a bulk read, comprising:

instructions for creating a socket structure for a socket associated with a logical port, wherein the socket structure contains a socket receive buffer;

instructions for initiating, by an application associated with the logical port, a bulk read function having a bulk read size, wherein the bulk read size is a size identified by the application associated with the logical port;

instructions for storing the bulk read size in a field in the socket structure;

instructions for determining if an amount of data in the socket receive buffer is equal to or greater than the bulk read size; and instructions, responsive to setting of a flag in the socket structure, for activating the bulk read function only when there is an amount of data in the socket receive buffer equal to or greater than the bulk read size;

wherein the instructions for activating the bulk read function include (i) instructions for copying an amount of data equal to the bulk read size from the socket receive buffer to an application buffer, and (ii) instructions for resetting the flag to deactivate the bulk read function, wherein the instructions for activating the bulk read function further include:

instructions for determining if there is data stored in the socket receive buffer after copying the amount of data equal to the bulk read size from the socket receive buffer to the application buffer; and instructions for sending a window update to a sending device if there is data stored in the socket receive buffer after the copying.

* * * * *